US010530740B2

(12) United States Patent
Jana (10) Patent No.: US 10,530,740 B2
(45) Date of Patent: Jan. 7, 2020

(54) SYSTEMS AND METHODS FOR FACILITATING CLOSED LOOP PROCESSING USING MACHINE LEARNING

(71) Applicant: AT&T Intellectual Property I, L.P., Atlanta, GA (US)

(72) Inventor: Rittwik Jana, Montville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 162 days.

(21) Appl. No.: 15/660,285

(22) Filed: Jul. 26, 2017

(65) Prior Publication Data

US 2019/0036869 A1 Jan. 31, 2019

(51) Int. Cl.
| | |
|---|---|
| *H04L 12/00* | (2006.01) |
| *H04L 29/12* | (2006.01) |
| *G06F 9/455* | (2018.01) |
| *H04L 29/08* | (2006.01) |
| *H04L 12/911* | (2013.01) |
| *H04L 12/24* | (2006.01) |
| *H04L 12/26* | (2006.01) |

(52) U.S. Cl.
CPC ...... *H04L 61/1511* (2013.01); *G06F 9/45558* (2013.01); *H04L 41/12* (2013.01); *H04L 43/08* (2013.01); *H04L 47/82* (2013.01); *H04L 61/2015* (2013.01); *H04L 67/10* (2013.01); *G06F 2009/4557* (2013.01); *G06F 2009/45595* (2013.01); *H04L 61/6022* (2013.01)

(58) Field of Classification Search
CPC ..... H04L 61/1511; H04L 67/10; H04L 47/82; H04L 61/6022; H04L 43/08; H04L 61/2015; H04L 41/12; G06F 9/45558; G06F 2009/45595; G06F 2009/4557
USPC .................................................. 709/224, 223
See application file for complete search history.

(56) References Cited

U.S. PATENT DOCUMENTS

| | | | | |
|---|---|---|---|---|
| 6,779,030 B1* | 8/2004 | Dugan | ............... | H04M 3/42136 379/221.08 |
| 7,089,293 B2* | 8/2006 | Grosner | ................... | H04L 29/06 709/217 |
| 7,216,350 B2* | 5/2007 | Martin | ..................... | H04M 3/42 379/201.01 |
| 7,433,304 B1* | 10/2008 | Galloway | ............... | H04L 47/10 370/229 |
| 7,725,559 B2* | 5/2010 | Landis | .................. | G06F 9/5016 709/215 |
| 8,650,245 B1* | 2/2014 | Ashley | .................... | H04L 51/12 709/203 |

(Continued)

*Primary Examiner* — Frantz Coby
(74) *Attorney, Agent, or Firm* — BakerHostetler (57) ABSTRACT

A virtual domain name system function is created in a data and analytic component of a platform disposed in a network in a cloud environment. The virtual domain name system function is implemented as a plurality of collector sites distributed throughout a plurality of network edges. A plurality of virtualized network functions are instantiated where each instantiation of the plurality of virtualized network function represents an active virtualized network function. Data is received at the plurality of collector sites from each active virtualized network function; and each instantiation is mapped so that each of the active virtualized network functions are reachable by any other of the plurality of virtualized network functions.

20 Claims, 10 Drawing Sheets

(56) References Cited

U.S. PATENT DOCUMENTS

| | | | |
|---|---|---|---|
| 8,717,895 B2* | 5/2014 | Koponen | H04L 12/4633 |
| | | | 370/235 |
| 8,918,835 B2* | 12/2014 | Ravindran | H04L 63/104 |
| | | | 726/1 |
| 9,235,856 B2 | 1/2016 | Parker | |
| 9,246,874 B2* | 1/2016 | Joe | H04L 61/303 |
| 9,419,937 B2 | 8/2016 | Bhagwat et al. | |
| 9,436,443 B2 | 9/2016 | Chiosi et al. | |
| 9,461,961 B2* | 10/2016 | Neerdaels | H04L 29/06 |
| 9,525,749 B2 | 12/2016 | Arkko et al. | |
| 2004/0044791 A1* | 3/2004 | Pouzzner | G06F 17/22 |
| | | | 709/245 |
| 2008/0235383 A1* | 9/2008 | Schneider | H04L 29/12594 |
| | | | 709/229 |
| 2010/0174811 A1 | 7/2010 | Musiri et al. | |
| 2011/0179150 A1* | 7/2011 | Ravichandran | G06Q 10/06 |
| | | | 709/221 |
| 2015/0142704 A1* | 5/2015 | London | G06F 16/90332 |
| | | | 706/11 |
| 2015/0178108 A1* | 6/2015 | Tarasuk-Levin | G06F 9/45558 |
| | | | 718/1 |
| 2016/0085576 A1 | 3/2016 | Chastain et al. | |
| 2016/0150076 A1 | 5/2016 | Foladare et al. | |
| 2016/0373474 A1* | 12/2016 | Sood | H04L 63/1425 |
| 2017/0012877 A1 | 1/2017 | Tsai | |

* cited by examiner

SYSTEMS AND METHODS FOR FACILITATING CLOSED LOOP PROCESSING USING MACHINE LEARNING

TECHNICAL FIELD

The subject matter disclosed relates generally to control loops implemented in integrated cloud environments, and more particularly to facilitating control loop processing using machine learning.

BACKGROUND

As the evolution of infrastructure/architecture moves to universal hardware with software defined functions, it is possible that the software defined functions migrate significantly from one piece of universal hardware to another. As such the software defined functions will necessarily be tracked (and subsequently mapped for addressing purposes) in a manner different than what is presently done with single function hardware (i.e., a piece of hardware (a router) typically has a network media access control address (MAC)-MAC pairing that doesn't often change or changes within a certain bound (e.g., Dynamic Host Configuration Protocol (DHCP) addressing)). The MAC address of a computer is a unique identifier assigned to network interfaces for communications at the data link layer of a network segment. MAC addresses are used as a network address for most IEEE 802 network technologies, including Ethernet and Wi-Fi. DHCP is a network protocol that enables a server to automatically assign an IP address to a computer from a defined range of numbers (i.e., a scope) configured for a given network. As virtualized network functions (VNFs) on universal hardware are instantiated, used and destroyed over an optimizable software defined network, an equivalent to the well-known Domain Name System (DNS) must be established to track and map these VNFs so they can be effective used in the software defined network (SDN) environment. VNFs, are responsible for handling specific network functions that run in one or more virtual machines on top of the hardware networking infrastructure, which can include routers, switches, servers, cloud computing systems and more. (i.e., may use a constrained set of DHCP addresses in combination with a MAC address). These physical devices are typically specific use (i.e., a router, a particular computer, a switch). In an infrastructure in which there is universal hardware which can simultaneously perform multiple virtual functions instantiated at any time (effectively becoming any machine-function type) and in which functionality can be moved from one piece of universal hardware to another with no anticipated service interruption, there is a need to track, map, and optimize data associated with the virtual functions and their activity.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including: creating a virtual domain name system function in a data and analytic component of a platform disposed in a network in a cloud environment, the network including a network core and a plurality of network edges; implementing the virtual domain name system function as a plurality of collector sites distributed throughout the plurality of network edges; instantiating a plurality of virtualized network functions where each instantiation of the plurality of virtualized network function represents an active virtualized network function; receiving data at the plurality of collector sites from each active virtualized network function; and mapping each instantiation, where each of the active virtualized network functions are reachable by any other of the plurality of virtualized network functions. Other embodiments of this aspect include corresponding computer systems, apparatus, and computer programs recorded on one or more computer storage devices, each configured to perform the actions of the methods.

One general aspect includes a system including: a processor, a storage device the storage device including instructions which when executed by the processor cause the system to perform operations including creating a virtual domain name system function in a data and analytic component of a platform in a network in a cloud environment, the network including a network core and a plurality of network edges. The system also includes instructions which when executed by the processor cause the system to perform operations including implementing the virtual domain name system function as a plurality of collector sites distributed throughout the network edges. The system also includes instructions which when executed by the processor cause the system to perform operations including instantiating a plurality of virtualized network functions where each instantiation of the plurality of virtualized network function represents an active virtualized network function. The system also includes instructions which when executed by the processor cause the system to perform operations including receiving data at the plurality of collector sites from each active virtualized network function. The system also includes mapping the instantiations, where each of the active virtualized network functions are reachable by any other of the plurality of virtualized network functions. Other embodiments of this aspect include corresponding computer systems, apparatus, and computer programs recorded on one or more computer storage devices, each configured to perform the actions of the methods.

One general aspect includes a machine readable medium having instructions stored thereon which when executed by a processor cause the processor to perform operations including: creating a virtual domain name system function in a data and analytic component in a platform in a network in a cloud environment, the network including a network core and a plurality of network edges; implementing the virtual domain name system function as a plurality of collector sites distributed throughout the network edges; instantiating a plurality of virtualized network functions where each instantiation of the plurality of virtualized network function represents an active virtualized network function; receiving data at the plurality of collector sites from each active virtualized network function; and mapping the instantiations, where each of the active virtualized network functions are reachable by any other of the plurality of virtualized network functions. Other embodiments of this aspect include corresponding computer systems, apparatus, and computer programs recorded on one or more computer storage devices, each configured to perform the actions of the methods.

DETAILED DESCRIPTION OF ILLUSTRATIVE EMBODIMENTS

Figure 1:
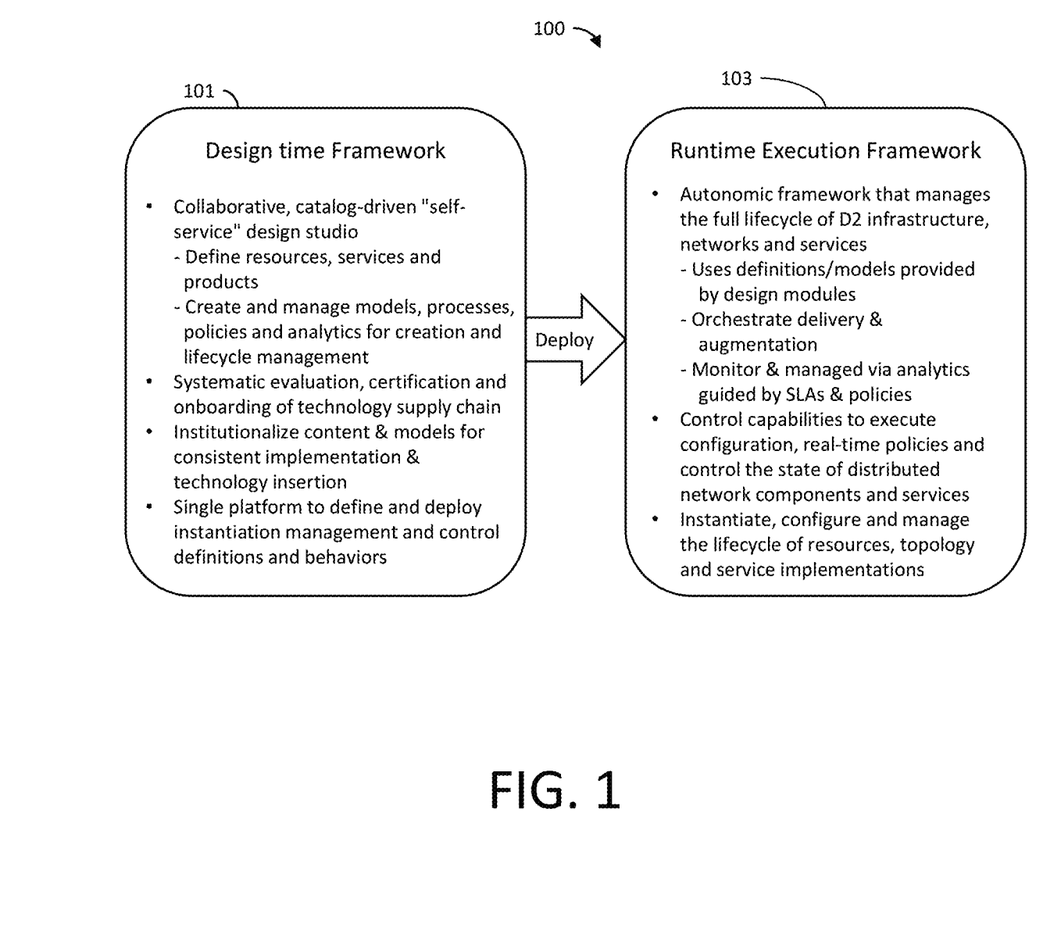
FIG. 1 is a block diagram illustrating the architecture of an enhanced control, orchestration, management and policy platform in which an embodiment of a system and method for facilitating control loop processing may be implemented.

Illustrated in FIG. 1 is a schematic of the architecture of an enhanced control, orchestration, management and policy platform, (ECOMP platform 100) that is implemented in a cloud environment. The ECOMP platform 100 includes a design time framework component 101 and a runtime execution framework 103. The cloud environment provides a number of capabilities including real-time instantiation of virtual machines (VMs) on commercial hardware where appropriate; dynamic assignment of application and workloads to VMs; dynamic movement of applications and dependent functions to different VMs on servers within and across data centers in different geographies (within the limits of physical access tiedowns constraints); and dynamic control of resources made available to applications (CPU, memory, storage). With the use of network function virtualization, network appliances have been transformed into software applications. In the integrated cloud environment the dynamic cloud capabilities are applied to applications—i.e., virtual network functions (VNFs)—thus applying the benefits of the cloud environment to virtual network elements. For example, VNFs, such as routers, switches, firewalls, can be "spun up" on commodity hardware, moved from one data center to another center dynamically (within the limits of physical access tie-down constraints) and resources such as CPU, memory and storage can be dynamically controlled.

The ECOMP platform 100 enables the rapid on-boarding of new services and the reduction of operating expenses and capital expenses through its metadata-driven service design and creation platform and its real-time operational management framework—a framework that provides real-time, policy driven automation of management functions. The metadata-driven service design and creation capabilities enable services to be defined with minimal information technology development required thus contributing to reductions in capital expenses. Real-time operational management framework provide significant automation of network management functions enabling the detection and correction of problems in an automated fashion contributing to reductions in operating expenses.

The ECOMP platform 100 enables product/service independent capabilities for design, creation and lifecycle management. The design time framework component 101 is an integrated development environment with tools, techniques, and repositories for defining/describing network assets. The design time framework component 101 facilitates re-use models thus improving efficiency as more models are available for reuse. Assets include models of the cloud environment resources, services and products. The models include various process specifications and policies (e.g., rule sets) for controlling behavior and process execution. Process specifications are used by the ECOMP platform 100 to automatically sequence the instantiation, delivery and lifecycle management aspects of the integrated cloud environment based resources, services, products and the components of the ECOMP platform 100. The design time framework component 101 supports the development of new capabilities, augmentation of existing capabilities and operational improvements throughout the lifecycle of a service. Service design and creation (SDC), policy, and data collection, analytics and events (DCAE) software development kits (SDKs) allow operations/security, 3rd parties (e.g., vendors), and other experts to continually define/refine new collection, analytics, and policies (including recipes for corrective/remedial action) using a design framework portal. Certain process specifications (aka 'recipes') and policies are geographically distributed to many points of use to optimize performance and maximize autonomous behavior in integrated cloud environment's federated cloud environment.

The runtime execution framework 103 executes the rules and policies distributed by a design and creation environment. This allows for the distribution of policy enforcement and templates among various ECOMP modules (described below). These components advantageously use common services that support logging, access control, and data management.

Figure 2:
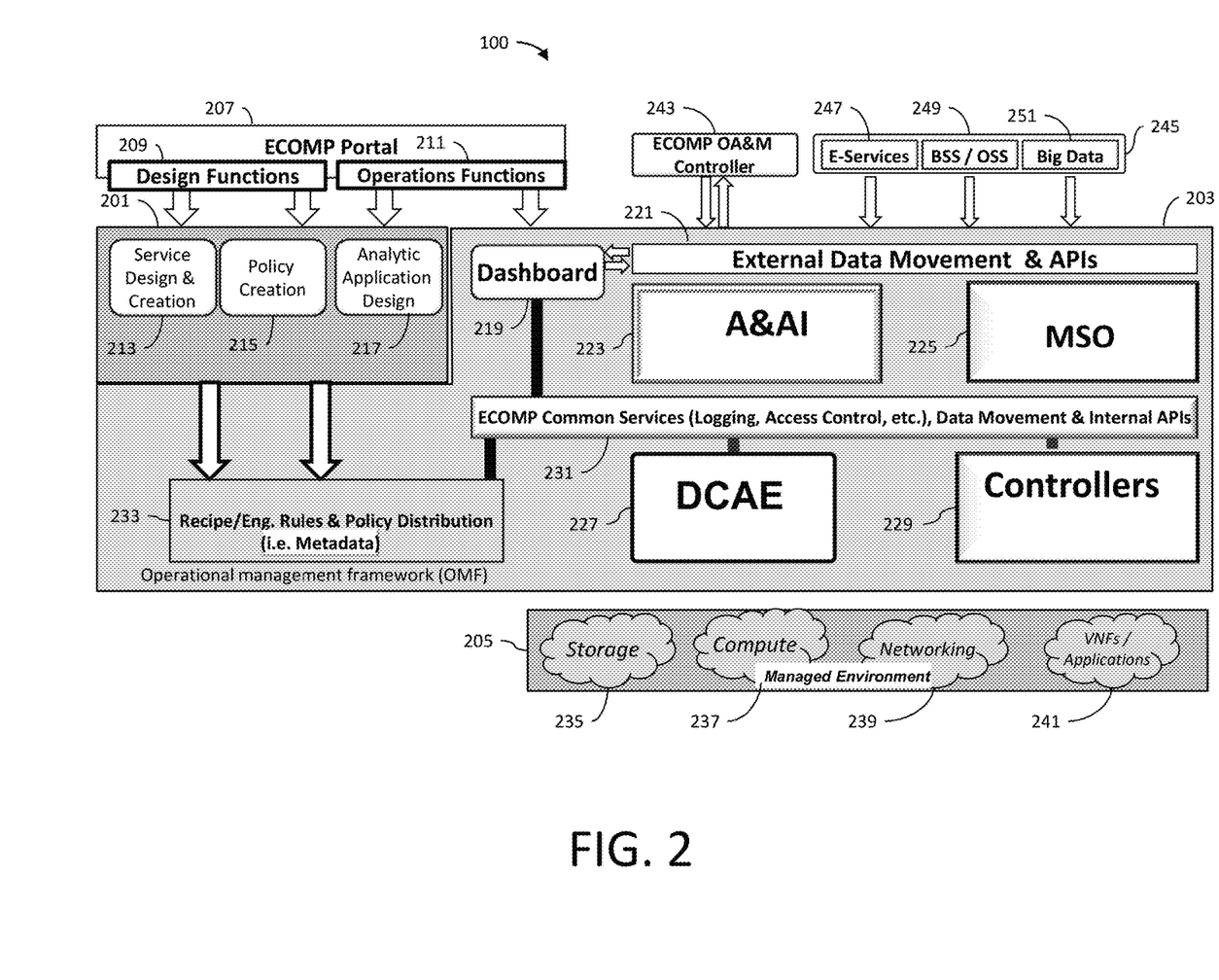
FIG. 2 is a block diagram of a platform for enhanced control, orchestration, management and policy in which embodiments a system and method for facilitating control loop processing may be implemented.

Illustrated in FIG. 2 are the components of an embodiment of the ECOMP platform 100. The ECOMP platform 100 is provided with three environments. These are the design creation environment 201, the execution environment 203, and the managed environment 205 shown as shaded areas in FIG. 2.

The ECOMP platform 100 includes an ECOMP Portal 207 that provides design functions 209 and operations functions 211. The design functions 209 include a service design and creation component 213 and policy creation component 215. The operations functions 211 include analytic application design component 217 and a dashboard 219. The service design and creation component 213, the policy creation component 215 and analytic application design component 217 are all part of the design creation environment 201. The dashboard is part of the execution environment 203.

In addition to the dashboard 219 the execution environment 203 includes: an external data movement and application program interface component, (API component 221); an active and available inventory module, (A&AI module 223); a master service orchestrator, (MSO 225); a data collection, analytics and events component, (DCAE module 227); controllers 229; a common services component 231; and a recipe/engineering rules and policy distribution component 233.

The managed environment 205 comprises resources, either hardware or software, that may be categorized as: infrastructure resources—(the Cloud resources, e.g., Storage 235, Compute 237); networking resources 239 (network connectivity functions & elements); and VNF/application resources 241 (the features and capabilities of a software application).

Interacting with the execution environment may be an operations, administration and management controller, (OA&M Controller 243); and a number of external applications 245 that may include e-services 247, business support system and operational support systems, (BSS/OSS application 249), and big data services 251 among others.

Figure 3:
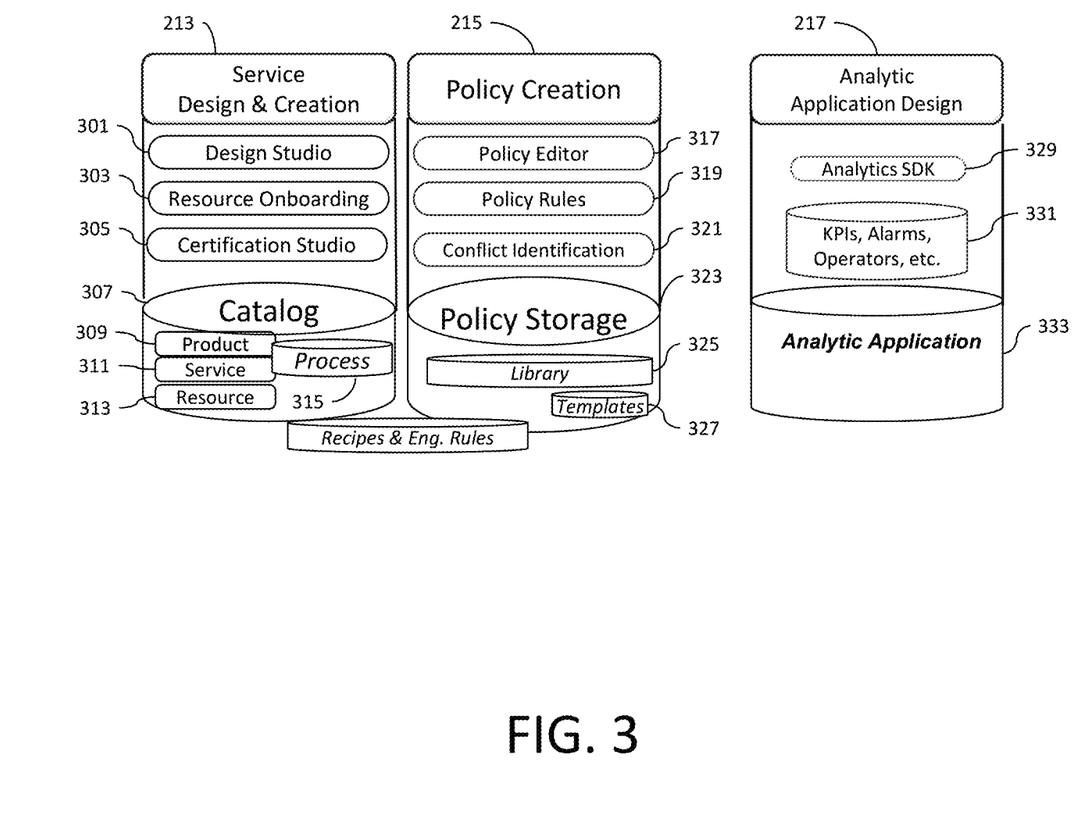
FIG. 3 is a block diagram of the service design and creation component, the policy creation component and the analytic application design component of the platform for enhanced control, orchestration, management and policy.

Illustrated in FIG. 3 are the subcomponents of the service design and creation component 213. The service design and creation component 213 is an integrated development environment with tools, techniques and repositories to define/ simulate/certify cloud environment assets as well as their associated processes and policies. The service design and creation component 213 may include a design studio subcomponent 301; a resource onboarding subcomponent 303; a certification studio subcomponent 305; a catalog subcomponent 307. Catalog subcomponent 307 may include information about groups such as products 309, services 311, resources 313 and processes 315.

The policy creation component 215 deals with policies, which are conditions and requirements, constraints, attributes, or needs that must be provided, maintained, and/or enforced. At a lower level the policy creation component 215 involves machine-readable rules enabling actions to be taken based on triggers or requests. Policies often consider specific conditions in effect (both in terms of triggering specific policies when conditions are met, and in selecting specific outcomes of the evaluated policies appropriate to the conditions). Policies allow rapid updates through easily updating rules, thus updating technical behavior of components in which those policies are used, without requiring rewrites of their software code. Policies permit simpler management/control of complex mechanisms via abstraction. The policy creation component 215 may include a policy editor 317; policy rules subcomponent 319; conflict identification subcomponent 321; policy storage subcomponent 323. The policy storage subcomponent 323 may include a library 325 and templates 327.

The policy creation component 215 has a broad scope supporting infrastructure, product/services, operation automation, and security-related policy rules. These policy rules are defined by multiple stakeholders, (Network/Service Designers, Operations, Security, customers, etc.). In addition, input from various sources (service design and creation component 213, policy editor 317, customer input, etc.) are collected and rationalized. Therefore, a centralized policy creation environment will be used to validate policies rules, identify and resolve overlaps and conflicts, and derive policies where needed. The policy creation component 215 is accessible, developed and managed as a common asset, and provides editing tools to allow users to easily create or change policy rules. Offline analysis of performance/fault/ closed-loop action data are used to identify opportunities to discover new signatures and refine existing signatures and closed loop operations. Policy translation/derivation functionality is also included to derive lower level policies from higher level policies. Conflict detection and mitigation are used to detect and resolve policies that may potentially cause conflicts, prior to distribution. Once validated and free of conflicts, policies are placed in an appropriate repository.

After completing initial policy creation or modification to existing policies, the policy distribution component 233 sends policies (e.g., from the repository) to their points of use, in advance of when they are needed. This distribution is intelligent and precise, such that each distributed policy-enabled function automatically receives only the specific policies which match its needs and scope.

Notifications or events can be used to communicate links/URLs for policies to components needing policies, so that components can utilize those links to fetch particular policies or groups of policies as needed. Components in some cases may also publish events indicating they need new policies, eliciting a response with updated links/URLs. Also, in some cases policies can be given to components indicating they should subscribe to one or more policies, so that they receive updates to those policies automatically as they become available.

The analytic application design component 217 includes an analytics software development kit (SDK 329), and storage 331 for key performance indicators (KPIs), alarms, operators, etc., as well as storage for analytic application 333.

Figure 4:
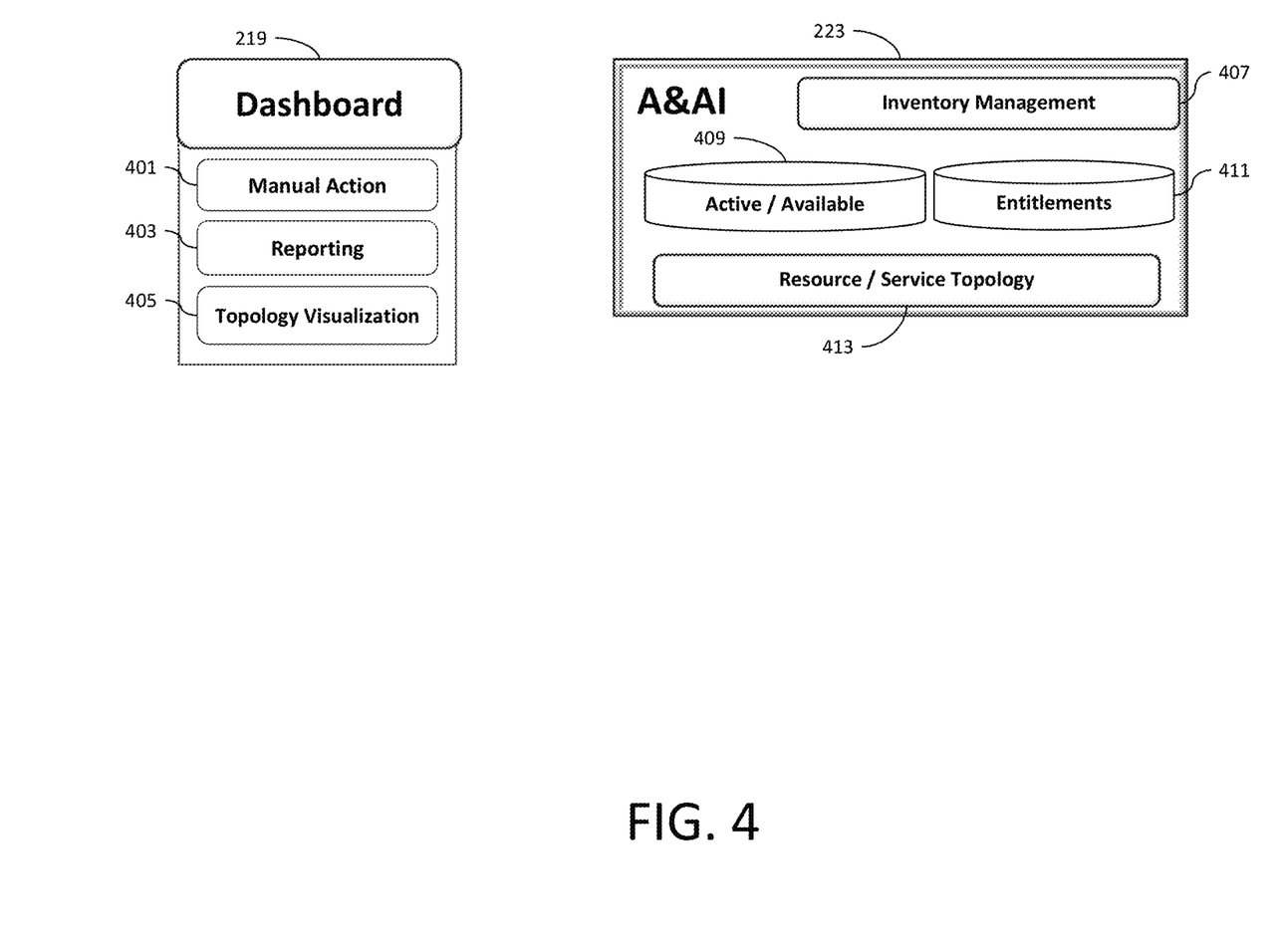
FIG. 4 is a block diagram of the dashboard and active and available inventory module of the platform for enhanced control, orchestration, management and policy.

As shown in FIG. 4, the dashboard 219 includes a manual action subcomponent 401, a reporting subcomponent 403 and a topology visualization subcomponent 405. The dashboard 219 provides access to design, analytics and operational control/administration functions.

The A&AI module 223 is the component that provides real-time views of the resources, services, products and their relationships. The views provided by the A&AI module 223 relate data managed by multiple ECOMP platforms 100, business support systems and operation support systems, (BSS/OSS application 249), and network applications to form a "top to bottom" view ranging from the products customers buy to the resources that form the raw material for creating the products. A&AI module 223 not only forms a registry of products, services, and resources, it also maintains up-to-date views of the relationships between these inventory items. Active and available inventory submodule 409 will manage these multi-dimensional relationships in real-time. The A&AI module 223 is provided with an inventory management submodule 407, an entitlements submodule 411 and a resource/service topology submodule 413.

The inventory management submodule 407 maintains real-time inventory and topology data by being continually updated as changes are made within the integrated cloud. It uses graph data technology to store relationships between inventory items. Graph traversals can then be used to identify chains of dependencies between items. Data views of the A&AI module 223 are used by homing logic during real-time service delivery, root cause analysis of problems, impact analysis, capacity management, software license management and many other integrated cloud environment functions.

The inventory and topology data includes resources, service, products, and customer subscriptions, along with topological relationships between them. Relationships captured by A&AI module 223 include "top to bottom" relationships such as those defined in the service design and creation component 213 and when products are composed of services, and services are composed of resources. It also includes "side to side" relationships such as end to end connectivity of virtualized functions to form service chains. A&AI module 223 also keeps track of the span of control of each controller, and is queried by MSO 225 and placement functions to identify which controller to invoke to perform a given operation.

A&AI module 223 is metadata driven, allowing new inventory item types to be added dynamically and quickly via catalog definitions, reducing the need for lengthy development cycles. A&AI module 223 provides the following key requirements:

Provide accurate and timely views of resource, service, and product inventory and their relationship to the customer's subscription;

Deliver topologies and graphs;

Maintain relationships to other key entities (e.g., location) as well as non-integrated cloud environment inventory;

Maintain the state of active, available and assigned inventory within the ECOMP platform 100;

Allow introduction of new types of Resources, Services, and Products without a software development cycle (i.e., be metadata driven);

Be easily accessible and consumable by internal and external clients;

Provide functional APIs that expose invariant services and models to clients;

Provide highly available and reliable functions and APIs capable of operating as generic cloud workloads that can be placed arbitrarily within the cloud infrastructure capable of supporting those workloads;

Scale incrementally as volumes in the ECOMP platform 100 and cloud infrastructure scales;

Perform to the requirements of clients, with quick response times and high throughput;

Enable vendor product and technology swap-outs over time, e.g., migration to a new technology for data storage or migration to a new vendor for MSO 225 or Controllers 229;

Enable dynamic placement functions to determine which workloads are assigned to specific components of the ECOMP platform 100 (i.e., Controllers 229 or VNFs) for optimal performance and utilization efficiency; and Identify the controllers 229 to be used for any particular request.

A&AI module 223 also performs a number of administrative functions. Given the model driven basis of the ECOMP platform 100, metadata models for the various catalog items are stored, updated, applied and versioned dynamically as needed without taking the system down for maintenance. Given the distributed nature of the A&AI module 223 as well as the relationships with other components of the ECOMP platform 100, audits are periodically run to assure that the A&AI module 223 is in sync with the inventory masters such as controllers 229 and MSO 225. Adapters allow the A&AI module 223 to interoperate with non-integrated cloud environment systems as well as 3rd party cloud providers via evolving cloud standards.

Consistent with other applications of the ECOMP platform 100, the A&AI module 223 produces canned and ad-hoc reports, integrates with the dashboard 219, publishes notifications other components of the ECOMP platform 100 can subscribe to, and performs logging consistent with configurable framework constraints.

Figure 5:
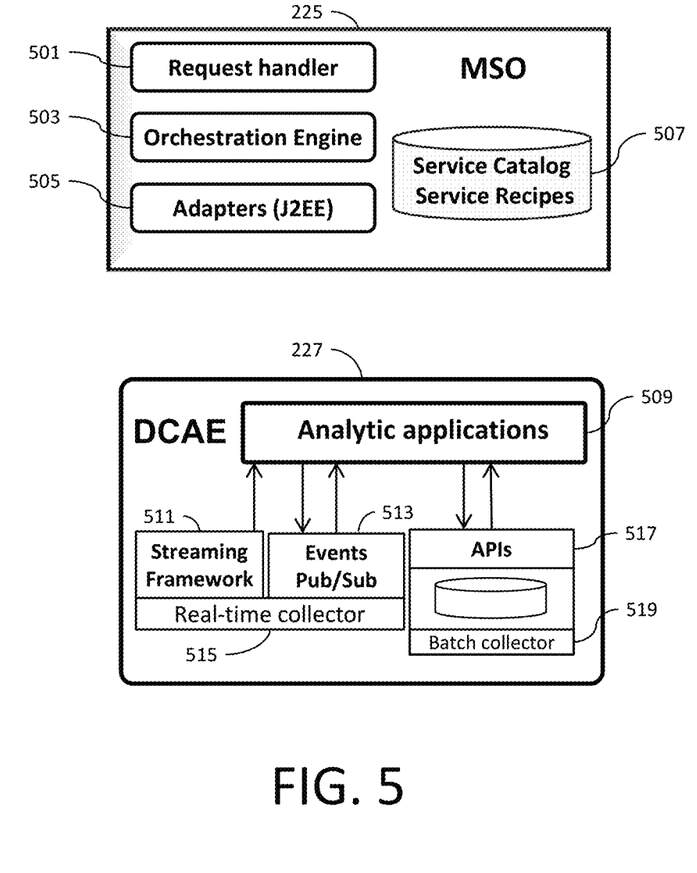
FIG. 5 is a block diagram of the master service orchestrator component and the data collection, analytics and events component of the platform for enhanced control, orchestration, management and policy.

The primary function of MSO 225 is the automation of end-to-end service instance provisioning activities. As shown in FIG. 5, MSO 225 includes a request handler 501, an orchestration engine 503, adapters 505, and service catalog service recipes 507. MSO provides an interface to orchestrate delivery of integrated cloud environment services. In general, orchestration can be viewed as the definition and execution of workflows or processes to manage the completion of a task. The ability to graphically design and modify a workflow process is the key differentiator between an orchestrated process and a standard compiled set of procedural code. Orchestration provides adaptability and improved time-to-market due to the ease of definition and change without the need for a development engagement. As such, it is a primary driver of flexibility in the architecture. Interoperating with policies, the combination provides a basis for the definition of a flexible process that can be guided by business and technical policies and driven by process designers.

Orchestration exists throughout the integrated cloud environment architecture and is not be limited to the constraints implied by the term "workflow" as it typically implies some degree of human intervention. Orchestration in integrated cloud environment will not involve human intervention/decision/guidance in the vast majority of cases. The human involvement in orchestration is typically performed up front in the design process although there may be processes that will require intervention or alternate action such as exception or fallout processing.

To support the large number of Orchestration requests, the orchestration engine 503 will be exposed as a reusable service. With this approach, any component of the architecture can execute process recipes. Orchestration services will be capable of consuming a process recipe and executing against it to completion. The Service model maintains consistency and reusability across all orchestration activities and ensures consistent methods, structure and version of the workflow execution environment.

As shown in FIG. 5, DCAE module 227 includes an analytic applications module 509, streaming framework 511, an events pub/sub 513, real-time collectors 515, APIs 517 and batch collector 519. In the integrated cloud environment virtualized functions across various layers of functionality are expected to be instantiated in a significantly dynamic manner that requires the ability to provide real-time responses to actionable events from virtualized resources, applications, as well as requests from customers, carrier partners and other providers. In order to engineer, plan, bill and assure these dynamic services, DCAE module 227 within the framework of the ECOMP platform 100 gathers key performance, usage, telemetry and events from the dynamic, multi-vendor virtualized infrastructure in order to compute various analytics and respond with appropriate actions based on any observed anomalies or significant events. These significant events include application events that lead to resource scaling, configuration changes, and other activities as well as faults and performance degradations requiring healing. The collected data and computed analytics are stored for persistence as well as use by other applications for business and operations (e.g., billing, ticketing). More importantly, the DCAE module 227 has to perform a lot of these functions in real-time.

DCAE module 227 provides real-time collectors 515 necessary to collect the instrumentation made available in the integrated cloud infrastructure. The scope of the data collection includes all of the physical and virtual elements (compute, storage and network) in the integrated cloud infrastructure. The collection includes the types of events data necessary to monitor the health of the managed environment, the types of data to compute the key performance and capacity indicators necessary for elastic management of the resources, the types of granular data (e.g., flow, session & call records) needed for detecting network & service conditions, etc. The collection will support both real-time streaming as well as batch methods of data collection.

DCAE module 227 needs to support a variety of applications and use cases ranging from real-time applications that have stringent latency requirements to other analytic applications that have a need to process a range of unstructured and structured data. DCAE module 227 needs to support all of these needs and must do so in a way that allows for incorporating new storage technologies as they become available. This may be done by encapsulating data access via APIs and minimizing application knowledge of the specific technology implementations.

Given the scope of requirements around the volume, velocity and variety of data that DCAE module 227 needs to support, the storage may use technologies that Big Data has to offer, such as support for NOSQL technologies, including in-memory repositories, and support for raw, structured, unstructured and semi-structured data. While there may be detailed data retained at the edge layer of DCAE module 227 for detailed analysis and trouble-shooting, applications may optimize the use of bandwidth and storage resources by ensuring they propagate only the required data (reduced, transformed, aggregated, etc.) for other analyses.

The DCAE module 227 includes an analytic framework which is an environment that allows for development of real-time applications (e.g., analytics, anomaly detection, capacity monitoring, congestion monitoring, alarm correlation etc.) as well as other non-real-time applications (e.g., analytics, forwarding synthesized or aggregated or transformed data to Big Data stores and applications); the intent is to structure the environment that allows for agile introduction of applications from various providers (Labs, IT, vendors, etc.). The framework supports the ability to process both a real-time stream of data as well as data collected via traditional batch methods. The analytic framework supports methods that allow developers to compose applications that process data from multiple streams and sources. Analytic applications are developed by various organizations, however, they all run in the DCAE module 227 and are managed by a DCAE controller (not shown). These applications are microservices developed by a broad community and adhere to the standards of the ECOMP platform 100.

The following list provides examples of types of applications that can be built on top of DCAE module 227 and that depend on the timely collection of detailed data and events by DCAE module 227. Analytics applications will be the most common applications that are processing the collected data and deriving interesting metrics or analytics for use by other applications or operations. These analytics range from very simple ones (from a single source of data) that compute usage, utilization, latency, etc. to very complex ones that detect specific conditions based on data collected from various sources. The analytics could be capacity indicators used to adjust resources or could be performance indicators pointing to anomalous conditions requiring response. The Fault/Event Correlation application is a key application that processes events and thresholds published by managed resources or other applications that detect specific conditions. Based on defined rules, policies, known signatures and other knowledge about the network or service behavior, this application would determine root cause for various conditions and notify interested applications and operations. A performance surveillance and visualization application provides a window to operations notifying them of network and service conditions. The notifications could include outages and impacted services or customers based on various dimensions of interest to Operations. They provide visual aids ranging from geographic dashboards to virtual information model browsers to detailed drilldown to specific service or customer impacts. The capacity planning application provides planners and engineers the ability to adjust forecasts based on observed demands as well as plan specific capacity augments at various levels, e.g., network functions virtualization infrastructure (NFVI) level (technical plant, racks, clusters, etc.), Network level (bandwidth, circuits, etc.), Service or Customer levels. A testing and trouble-shooting application provides operations the tools to test and trouble-shoot specific conditions. They could range from simple health checks for testing purposes, to complex service emulations orchestrated for troubleshooting purposes. In both cases, DCAE module 227 provides the ability to collect the results of health checks and tests that are conducted. These checks and tests could be done on an ongoing basis, scheduled or conducted on demand. Some components of integrated cloud environment may expose new targets for security threats. Orchestration and control, decoupled hardware and software, and commodity hardware may be more susceptible to attack than proprietary hardware. However, software defined networks (SDN) and virtual networks also offer an opportunity for collecting a rich set of data for security analytics applications to detect anomalies that signal a security threat, such as distributed denial of service (DDoS) attack, and automatically trigger mitigating action. The applications that are listed above are by no means exhaustive and the open architecture of DCAE module 227 will lend itself to integration of application capabilities over time from various sources and providers.

Figure 6:
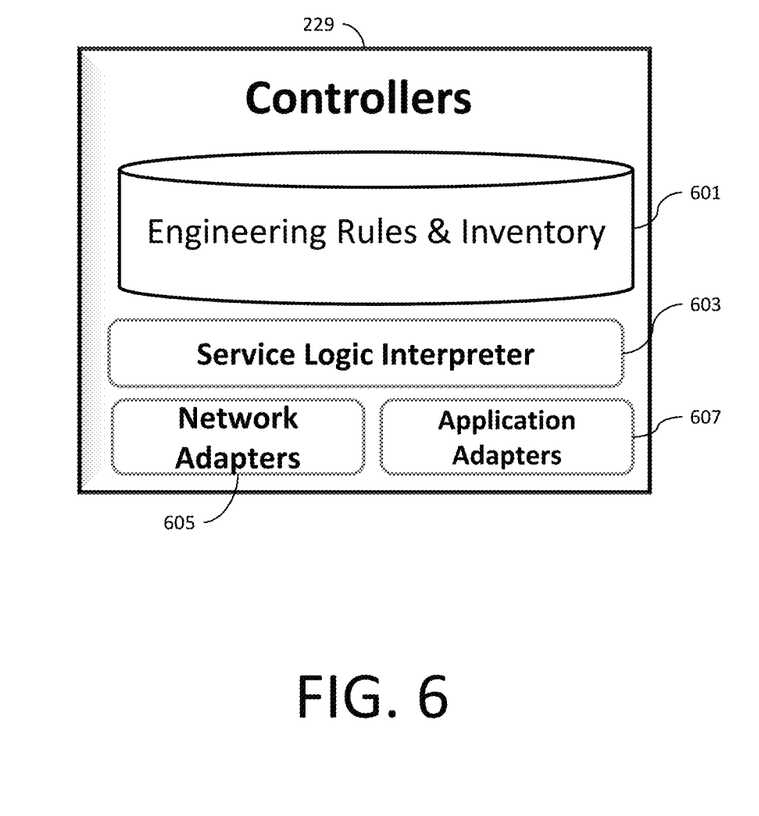
FIG. 6 is a block diagram of the components for the controllers of the platform for enhanced control, orchestration, management and policy.

Illustrated in FIG. 6 are the components of the controllers 229. Controllers 229 include an engineering rules and inventories module 601, a service logic interpreter module 603; a network adapter module 605, and an application adapter module 607. Controllers are applications which are intimate with cloud and network services and execute the configuration, real-time policies, and control the state of distributed components and services.

Figure 7:
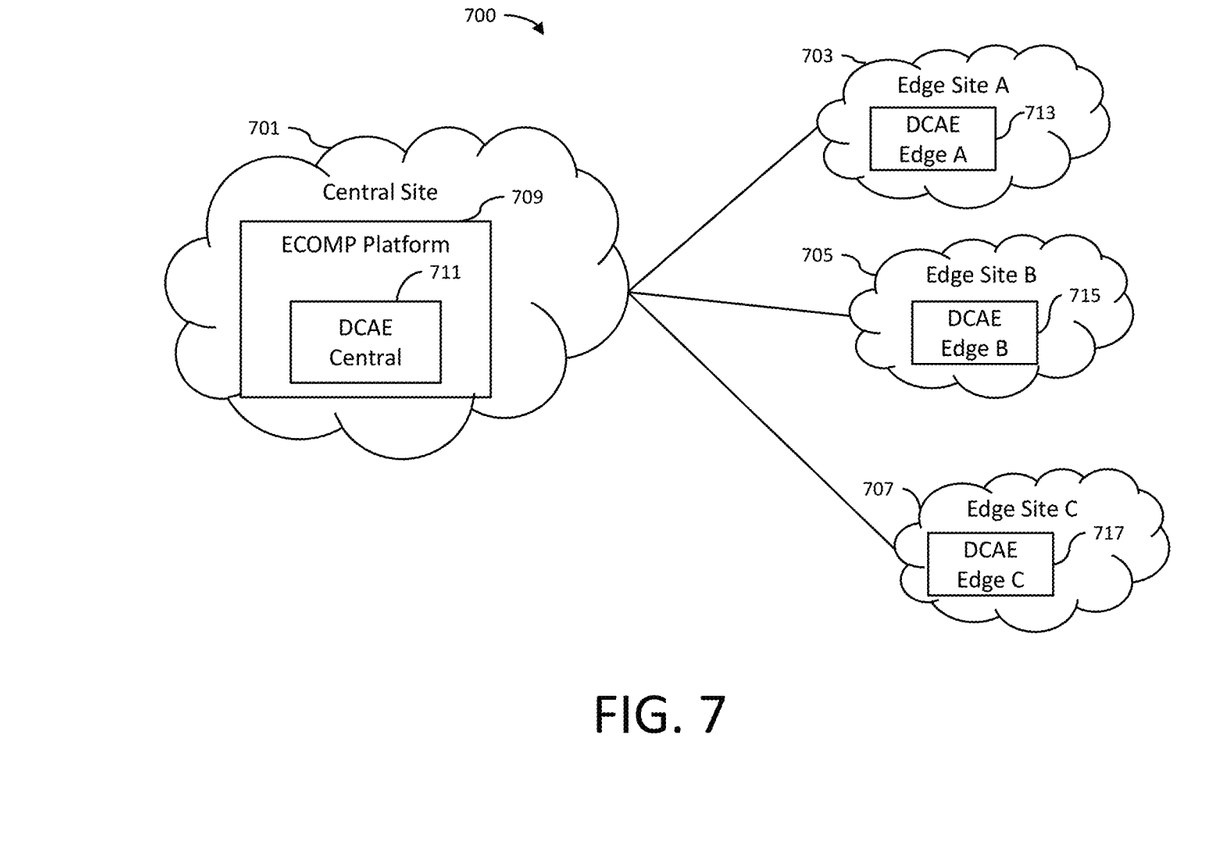
FIG. 7 is a block diagram of the architecture of a cloud environment in which a system and method for facilitating control loop processing may be implemented.

Illustrated in FIG. 7 is high level block diagram of a cloud environment 700 with a central site 701 and a plurality of edge sites, edge site A 703, edge site B 705 and edge site C 707. The central site 701 includes an ECOMP platform 709 having an analytics component the DCAE central 711. Edge site A 703 has an analytics component DCAE edge A 713. Edge site B 705 has an analytics component DCAE edge B 715. And edge site C 707 has an analytics component DCAE edge A 717.

Figure 8:
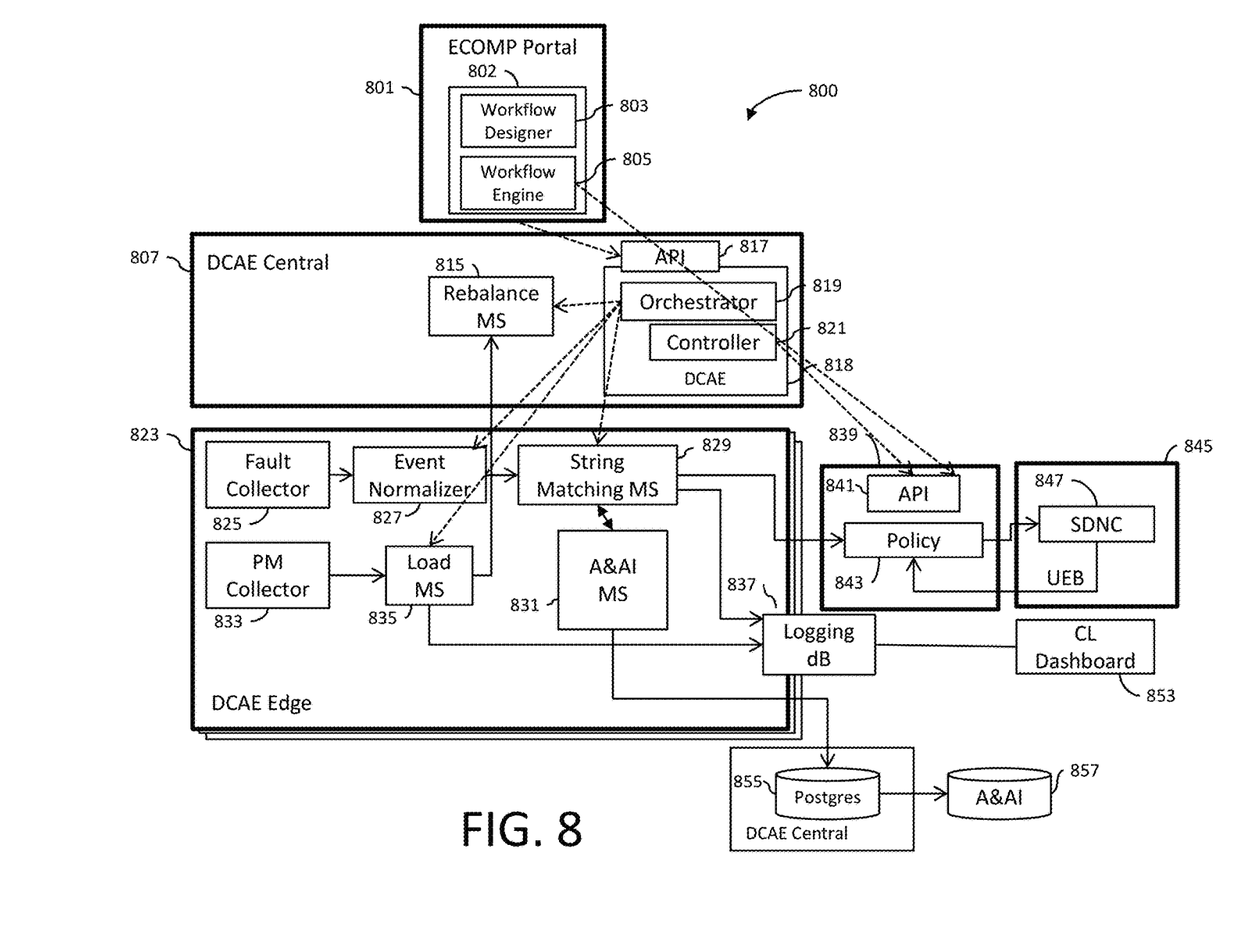
FIG. 8 is a block diagram of an embodiment of a domain name system server closed loop for a distributed design.

Illustrated in FIG. 8 is a block diagram of a domain name system server closed loop 800 of a distributed design. The domain name system service closed loop 800 includes a platform web portal 801 that is a front end to gain access to all applications in a platform (not shown) for the cloud environment. Web portal 801 may be used to access a control loop designer application 802 which may include a workflow designer module 803 and a workflow engine 805. The control loop designer application 802 receives input from a user and a workflow design module 803 provides a control loop template that is distributed by a workflow engine 805.

The domain name system server closed loop 800 includes an analytic component, DCAE central module 807, that is disposed in the central site 701. DCAE central module 807 collects performance, usage, and configuration data; provides computation of analytics; aids in trouble-shooting; and publishes events, data and analytics (e.g., to policy, orchestration, and a storage repository that holds a vast amount of raw data in its native format until it is needed ("Data Lake")). It collects performance, usage, and configuration data; provides computation of analytics; aids in troubleshooting; and publishes events, data and analytics (e.g., to policy, orchestration, and Data Lake.). The DCAE Central module 807 also includes a rebalance microservice 815 and an analytics component, DCAE 818. DCAE 118 includes API 117, orchestrator 119 and a controller 121.

The domain name system service closed loop 800 also includes DCAE Edge 823 that is an analytics component that is disposed on an edge site (e.g. edges site A 703, in FIG. 7)

DCAE Edge 823 includes a fault collector 825 that generates alarms when there is a fault in virtual machine in the edge site (e.g. edge site A 703 in FIG. 7). Examples of when alarms may be triggered include failure of the virtual machine, the host being down or memory being below a certain number. DCAE Edge 823 also includes an event normalizer 827 that coverts the raw trap data from the fault collector 825 into a structured data format. The structured data is sent to a string matching microservice 829 that acts as a fault detector and sends instructions to the policy component 843 that corrects the fault in the virtual machine. The string matching microservice 829 accesses the A&AI microservice 831 that provides real time status of what is in the field at the edge site. A&AI microservice 831 provides information about the location of the edge site, IP addresses and the like. A&AI microservice 831 may provide information to a data store 855 located in DCAE central 807 which in turns provides the information to A&AI data store 857. The string matching microservice 829 sends event information (e.g. Onset of virtual domain name system site overload) to the rebalance microservice 815 that observes data from the edge sites and makes decisions on how to rebalance virtual domain name system software when it is overloaded. For example, in the case of a virtual domain name system overload it may restart another virtual domain name system service in another edge site.

DCAE Edge 123 also includes a performance metrics collector 833 that collects performance data related to edge virtual machines. Performance metrics are sent to the load microservice 835 which in turn sends the information to the rebalance microservice 815.

DCAE Edge 123 also includes a logging database 837 that stores performance metric information and makes it available to a control dashboard 853.

The domain name system service closed loop 800 includes a policy module 839 having an API 841 and a policy component 843. Fault information from the string matching micro service 829 may be provided to the policy component 843 for adjustments to policies. The policies component may interact with a software defined network controller 847 disposed within UEB 845.

The domain name system server closed loop 800 for a distributed design creates a virtual DNS function (vDNS) as part of the Data Collection, Analytics and Events (DCAE) module of an ECOMP platform. DCAE supports closed loop control and higher-level correlation for business and operations activities. It is the ecosystem component supporting analytics and events: it collects performance, usage, and configuration data; provides computation of analytics; aids in trouble-shooting; and publishes events, data and analytics (e.g., to policy, orchestration, and the Data Lake). The vDNS, implemented as multiple collector sites distributed throughout the network will take in data from different VNF instantiations representing active VNFs and mapping these instantiations (thereby making them known or reachable by other VNFs. Further, performance data will be collected from universal hardware and analyzed, yielding performance metrics which can then be used by the vDNS system to optimize VNF instantiations on a particular piece or subset of universal hardware as well as migrate active VNFs to underutilized pieces of universal hardware thereby maintaining both local and global optimized network utilization. Through the use of machine learning techniques, anticipatory changes to the network can be achieved proactively reconfiguring potential network hot spots before they become an issue. Machine learning is a field of computer science directed to providing computers with the ability to learn without being explicitly programmed. Machine learning utilizes algorithms that can learn from and make predictions on data by building a model from sample inputs. There are numerous known machine learning techniques. These include decision tree learning, neural networks, random forest, rule based machine learning, among others.

The technical benefits of the solution are significant: (1) the solution provides a methodology for continued, closed loop optimization and reconfiguration of an active SDN network; (2) Network/VNF performance parameters collected can be used to predictively instantiate VNF functionality to optimize network capability. (3) Commercial benefits allow for a zero-down time customer experience; (4) Commercial benefits allow for a determination of SLA's based upon highest up-time universal hardware clusters.

Figure 9:
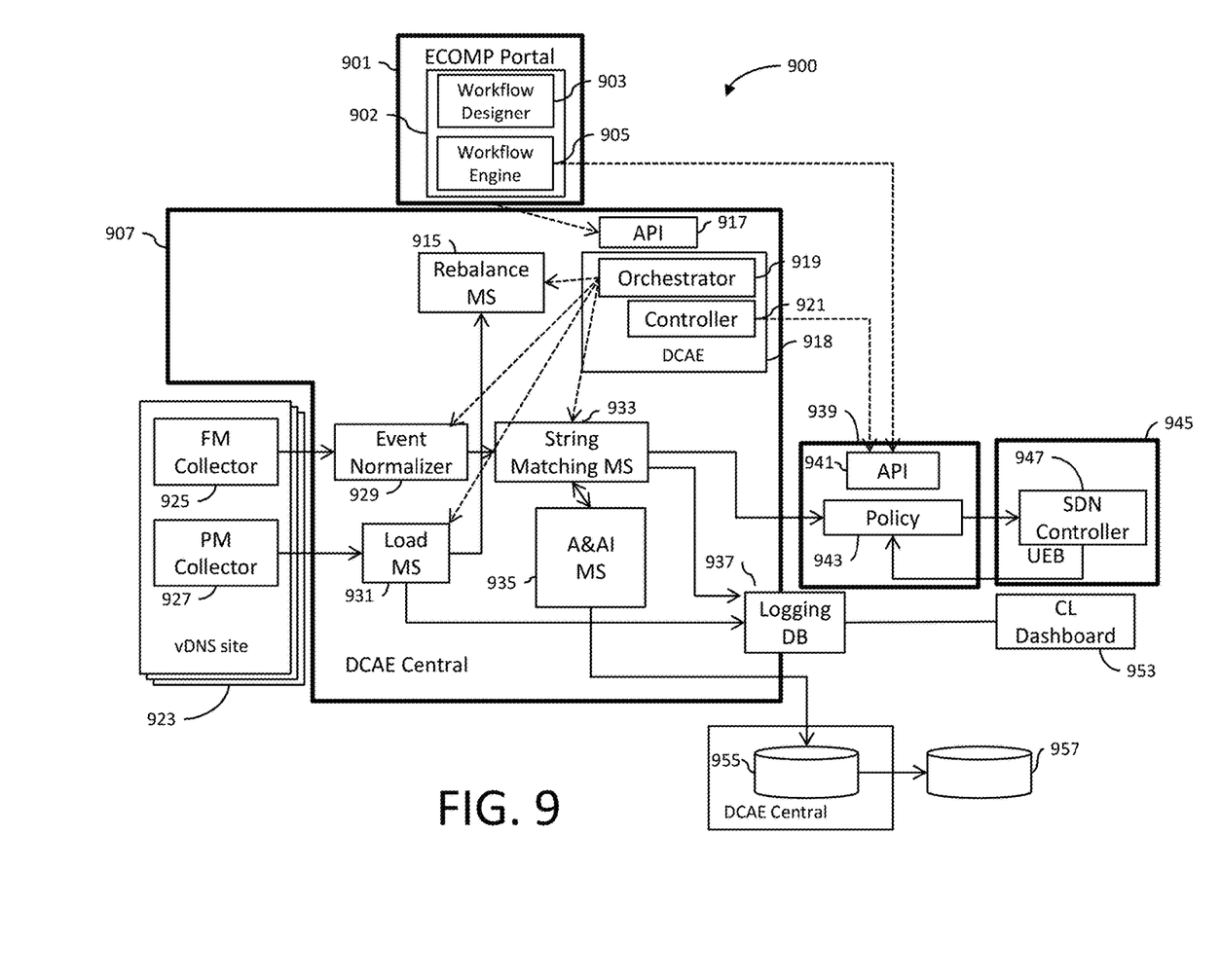
FIG. 9 is a block diagram of an embodiment of a domain name system server closed loop for a centralized design.
Figure 10:
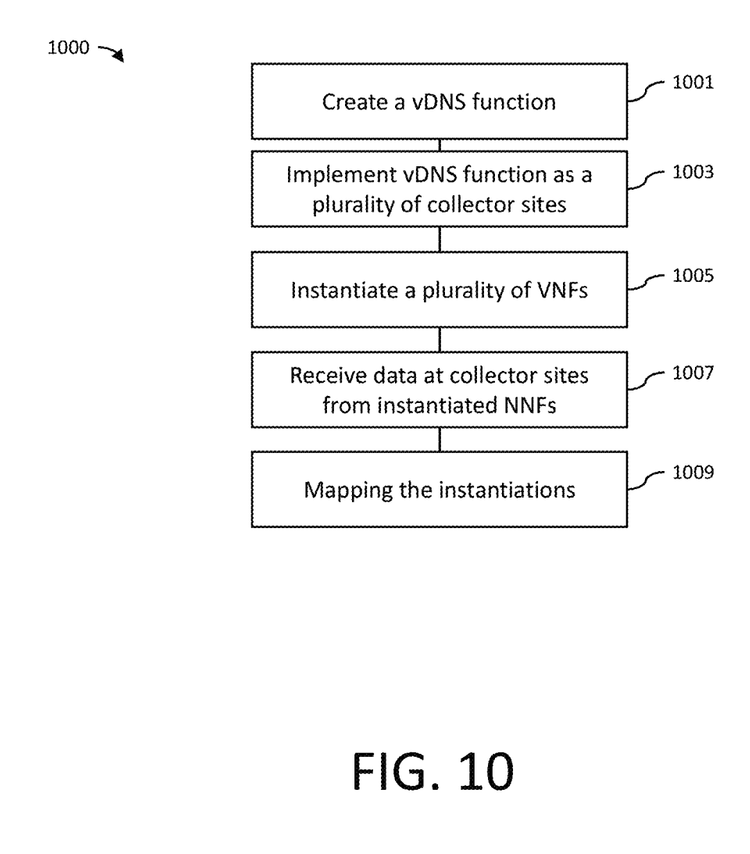
FIG. 10 is a flowchart of an embodiment of a method for creating and implementing a closed loop domain name system.

Illustrated in FIG. 9 is a block diagram of a domain name system server closed loop 900 of a centralized design. The domain name system service closed loop 900 includes a platform web portal 901 that is a front end to gain access to all applications in a platform (not shown) for the cloud environment. Web portal 901 may be used to access a control loop designer application 902 which may include a workflow designer module 903 and a workflow engine 905. The control loop designer application 902 receives input from a user and a workflow design module 903 provides a control loop template that is distributed by a workflow engine 905.

The domain name system service closed loop 900 includes an analytic component, DCAE central component 907, that is disposed in the central site 701. DCAE central module 907 collects performance, usage, and configuration data; provides computation of analytics; aids in trouble-shooting; and publishes events, data and analytics (e.g., to policy, orchestration, and the Data Lake).it collects performance, usage, and configuration data; provides computation of analytics; aids in trouble-shooting; and publishes events, data and analytics (e.g., to policy, orchestration, and Data Lake.). The DCAE Central module 907 also includes a rebalance microservice 915 and an analytics component, DCAE 918. DCAE 918 includes API 917, orchestrator 919 and a controller 921.

A fault metrics collector 925 and a performance metrics collector 927 may be disposed in each of the plurality of the domain name system sites 923. Data from the fault metrics collector 925 is sent to the event normalizer 929 that takes raw data from the fault metrics collector 125 and normalizes it into a structured data format. The structured data is sent to a string matching micro service 933 that detects faults in the virtual machines at the vDNS sites 923. The string matching micro service 933 may send the data to a policy component 939 that includes an API 941 and a policy module 943. The performance metrics collector 927 collects performance data related to edge virtual machines. Performance metrics are sent to the load microservice 931 which in turn sends the information to the rebalance microservice 915.

DCAE Edge 123 also includes a logging database 837 that stores performance metric information and makes it available to a control dashboard 853.

The domain name system service closed loop 800 includes a policy module 139 having an API 141 and a policy component 843. Fault information from the string matching micro service 829 may be provided to the policy component 843 for adjustments to policies. The policies component may interact with a software defined network controller 847 disposed within UEB 845.

As described above, the exemplary embodiments can be in the form of processor-implemented processes and devices for practicing those processes, such as a server in a regional network or cloud data center. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed:

1. A computer-implemented method for facilitating closed loop processing of domain names comprising executing on a processor the steps of:
    creating a virtual domain name system function in a data and analytic component of a platform disposed in a network in a cloud environment, the network comprising a network core and a plurality of network edges;
    implementing the virtual domain name system function as a plurality of collector sites distributed throughout the plurality of network edges;
    instantiating a plurality of virtualized network functions where each instantiation of the plurality of virtualized network function represents an active virtualized network function;
    receiving data at the plurality of collector sites from each active virtualized network function; and
    mapping each instantiation, whereby each of the active virtualized network functions are reachable by any other of the plurality of virtualized network functions.

2. The computer-implemented method of claim 1 further comprising:
    collecting performance data from a plurality of universal hardware disposed in the network in which a set of the plurality of virtualized network function have been instantiated; and
    analyzing the performance data to yield performance metrics.

3. The computer-implemented method of claim 2 further comprising using the performance metrics to optimize plurality of virtualized network functions instantiations of at least one of the plurality of universal hardware.

4. The computer-implemented method of claim 2 further comprising using the performance metrics to migrate a subset of the active virtualized network functions to at least one of the plurality of universal hardware that is underutilized whereby both local and global optimized network utilization is achieved.

5. The computer-implemented method of claim 4 further comprising using machine learning techniques to reconfigure potential network hot spots.

6. The computer-implemented method of claim 2 wherein the steps of collecting performance data and analyzing performance data are performed at the network edges.

7. The computer-implemented method of claim 2 wherein the steps of collecting performance data and analyzing performance data are performed at the network core.

8. A system comprising:
    a processor;
    a storage device
    the storage device including instructions which when executed by the processor cause the system to perform operations comprising:
        creating a virtual domain name system function in a data and analytic component in a platform in a network in a cloud environment, the network comprising a network core and a plurality of network edges;
        implementing the virtual domain name system function as a plurality of collector sites distributed throughout the network edges;
        instantiating a plurality of virtualized network functions where each instantiation of the plurality of virtualized network function represents an active virtualized network function;
        receiving data at the plurality of collector sites from each active virtualized network function; and
        mapping the instantiations, whereby each of the active virtualized network functions are reachable by any other of the plurality of virtualized network functions.

9. The system of claim 8 wherein the storage device includes further instructions which when executed by the processor cause the system to perform further operations comprising:
    collecting performance data from a plurality of universal hardware in the network; and
    analyzing the performance data to yield performance metrics.

10. The system of claim 9 wherein the storage device includes further instructions which when executed by the processor cause the processor to perform further operations comprising:

using the performance metrics to optimize the plurality of virtualized network functions instantiations of at least one of the plurality of universal hardware.

11. The system of claim 9 wherein the storage device includes further instructions which when executed by the processor cause the processor to perform further operations comprising:
using the performance metrics to migrate a subset of the active virtualized network functions to at least one of the plurality of universal hardware that is underutilized whereby both local and global optimized network utilization is achieved.

12. The system of claim 11 wherein the storage device includes further instructions which when executed by the processor cause the processor to perform further operations comprising:
using machine learning techniques to reconfigure potential network hot spots.

13. The system of claim 8 wherein the operations comprising collecting performance data and analyzing performance data are performed at the plurality of network edges.

14. The system of claim 8 wherein the operations comprising collecting performance data and analyzing performance data are performed by at the network core.

15. A non-transitory, tangible computer readable medium having instructions stored thereon which when executed by a processor cause the processor to perform operations comprising:
creating a virtual domain name system function in a data and analytic component in a platform in a network in a cloud environment, the network comprising a network core and a plurality of network edges;
implementing the virtual domain name system function as a plurality of collector sites distributed throughout the network edges;
instantiating a plurality of virtualized network functions where each instantiation of the plurality of virtualized network function represents an active virtualized network function;
receiving data at the plurality of collector sites from each active virtualized network function; and
mapping the instantiations, whereby each of the active virtualized network functions are reachable by any other of the plurality of virtualized network functions.

16. The non-transitory, tangible computer readable medium of claim 15 further comprising further instructions which when executed by the processor cause the processor to perform further operations comprising:
collecting performance data from a plurality of universal hardware in the network; and
analyzing the performance data to yield performance metrics.

17. The non-transitory, tangible computer readable medium of claim 16 further comprising further instructions which when executed by the processor cause the processor to perform further operations comprising:
using the performance metrics to optimize plurality of virtualized network functions instantiations of at least one of the plurality of universal hardware.

18. The non-transitory, tangible computer readable medium of claim 16 further comprising further instructions which when executed by the processor cause the processor to perform further operations comprising:
using the performance metrics to migrate a subset of the active virtualized network functions to at least one of the plurality of universal hardware that is underutilized whereby both local and global optimized network utilization is achieved.

19. The non-transitory, tangible computer readable medium of claim 18 further comprising further instructions which when executed by the processor cause the processor to perform further operations comprising:
using machine learning techniques to reconfigure potential network hot spots.

20. The non-transitory, tangible computer readable medium of claim 15 wherein the operations comprising collecting performance data and analyzing performance data are performed at the plurality of network edges.

* * * * *